United States Patent
Yoshioka et al.

(10) Patent No.: US 11,271,450 B2
(45) Date of Patent: Mar. 8, 2022

(54) ROTARY ELECTRIC MACHINE PROVIDED WITH COOLING STRUCTURE

(71) Applicant: DENSO CORPORATION, Kariya (JP)

(72) Inventors: Shohei Yoshioka, Kariya (JP); Atsuo Ishizuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 16/736,965

(22) Filed: Jan. 8, 2020

(65) Prior Publication Data
US 2020/0220421 A1    Jul. 9, 2020

(30) Foreign Application Priority Data
Jan. 8, 2019   (JP) .............................. JP2019-001295

(51) Int. Cl.
*H02K 5/20* (2006.01)
*H02K 9/19* (2006.01)
(Continued)

(52) U.S. Cl.
CPC .............. *H02K 5/20* (2013.01); *H02K 9/19* (2013.01); *H02K 11/21* (2016.01); *H02K 24/00* (2013.01)

(58) Field of Classification Search
CPC .......... H02K 5/20; H02K 24/00; H02K 11/21; H02K 9/19; H02K 2213/03; H02K 1/20;
(Continued)

(56) References Cited

U.S. PATENT DOCUMENTS

| 6,722,422 B1 * | 4/2004 | Feldmeier ............... F28D 7/106 138/114 |
| 2003/0222519 A1 * | 12/2003 | Bostwick ................ H02K 5/20 310/58 |

(Continued)

FOREIGN PATENT DOCUMENTS

| DE | 102012215018 A1 | 2/2014 | |
| JP | 06269143 A * | 9/1994 | ............... H02K 5/20 |

(Continued)

OTHER PUBLICATIONS

Hiroshi Hamano, Housing Cooling Type Rotary Electric Machine, Sep. 22, 1994, Hitachi Ltd, JP 06269143 (English Machine Translation) (Year: 1994).*

*Primary Examiner* — Quyen P Leung
*Assistant Examiner* — Alexander A Singh
(74) *Attorney, Agent, or Firm* — Oliff PLC

(57) ABSTRACT

A rotary electric machine includes a cylindrical portion. In the cylindrical portion, a coolant passage having annular shape is formed to allow the coolant to flow therethrough. The coolant passage is formed meandering in the axial direction and the passage width of the coolant passage in a first end side in the radial direction is narrower than the passage width in the radial direction in the second end side. The coolant passage includes a circumferential passage in the first end side where the coolant flows in the circumferential direction. The circumferential passage is configured such that a passage opening area of an intermediate portion between an input portion in an upstream side of the coolant passage and an output portion in a downstream side of the coolant passage is expanded compared to those of the input portion and the output portion.

8 Claims, 9 Drawing Sheets

(51) Int. Cl.
*H02K 11/21* (2016.01)
*H02K 24/00* (2006.01)

(58) Field of Classification Search
CPC .......... H02K 1/32; H02K 9/197; H02K 5/203;
H02K 9/00; H02K 9/08; H02K 9/10;
H02K 9/12; H02K 9/14; H02K 9/16;
H02K 9/18; H02K 9/193; H02K 9/20;
H02K 9/22; H02K 9/223; H02K 9/225;
H02K 9/227
USPC ........... 310/89, 52, 53, 54, 55, 57, 60 A, 64,
310/68 B
See application file for complete search history.

(56) References Cited

U.S. PATENT DOCUMENTS

| | | | |
|---|---|---|---|
| 2004/0035481 A1* | 2/2004 | Lim ...................... | B01F 5/0646 |
| | | | 138/42 |
| 2006/0220481 A1* | 10/2006 | Takekawa ............ | H02K 11/225 |
| | | | 310/90.5 |
| 2012/0112572 A1* | 5/2012 | Le Besnerais ........... | H02K 9/19 |
| | | | 310/58 |
| 2015/0015096 A1* | 1/2015 | Huber ...................... | H02K 5/20 |
| | | | 310/54 |

FOREIGN PATENT DOCUMENTS

| | | |
|---|---|---|
| JP | 2008-253024 A | 10/2008 |
| JP | 2020-058219 A | 4/2020 |
| WO | 2012/066072 A2 | 5/2012 |

\* cited by examiner

SECOND END SIDE ←→ FIRST END SIDE

ROTARY ELECTRIC MACHINE PROVIDED WITH COOLING STRUCTURE

CROSS-REFERENCE TO RELATED APPLICATION

This application is based on and claims the benefit of priority from earlier Japanese Patent Application No. 2019-1295 filed Jan. 8, 2019, the description of which is incorporated herein by reference.

BACKGROUND

Technical Field

The present disclosure relates to rotary electric machines.

Description of the Related Art

Conventionally, a rotary electric machine provided with a cooling structure is proposed. The cooling structure includes a cooling passage in a cylindrical portion of a housing configured of a cylindrical structure through which the coolant flows to cool the stator or the like by the coolant.

SUMMARY

The present disclosure provides a rotary electric machine provided with a rotor; a stator; a housing having a cylindrical portion in which the stator is assembled radially inside or outside the rotor; and a rotation sensor. The cylindrical portion includes an inner wall portion and an outer wall portion mutually facing inwardly/outwardly in the radial direction, a coolant passage having an annular shape is provided between the inner wall portion and the outer wall portion to allow a coolant to flow through the coolant passage.

DETAILED DESCRIPTION OF THE PREFERRED EMBODIMENTS

As a conventional rotary electric machine having a cooling structure, for example, JP-A-2008-253024 discloses a cooling passage structure of an on-vehicle motor in which the cooling passage meanders in the axial direction between the coolant inlet and the coolant outlet. Specifically, in the cylindrical portion of the housing, a plurality of dividing walls extending in the axial direction are provided to be apart from each other in the circumferential direction, and communication portions are provided at axial-direction end portions of respective dividing walls adjacently located in the circumferential direction, thereby forming a serial meandering coolant passage. In this case, the coolant flows to the coolant outlet from the coolant inlet while the flow direction of the coolant in the axial direction is alternately inverted.

Note that a rotation sensor such as a resolver is provided in the rotary electric machine to detect the rotational state. According to the rotation sensor, the rotation sensor is affected by the heat produced by the rotary electric machine, which may cause detection errors. For this reason, in order to maintain the detection accuracy of the rotation sensor, it is required to avoid effects of heat during the operation of the rotary electric machine. In this respect, for the conventional technique, an improvement may be required for appropriately cooling the rotational sensor.

Hereinafter, with reference to the drawings, embodiments will be described. A rotary electric machine according to the present embodiment is used for a vehicle power source. Note that the rotary electric machine can be widely used for industrial facilities, vehicles, ships, planes, home electronics, equipment for office automation, and game machines. In the following embodiments, the same reference signs are designated to elements having the same or substantially the same functions, and the description will be omitted or will be described as needed.

First Embodiment

Figure 1:
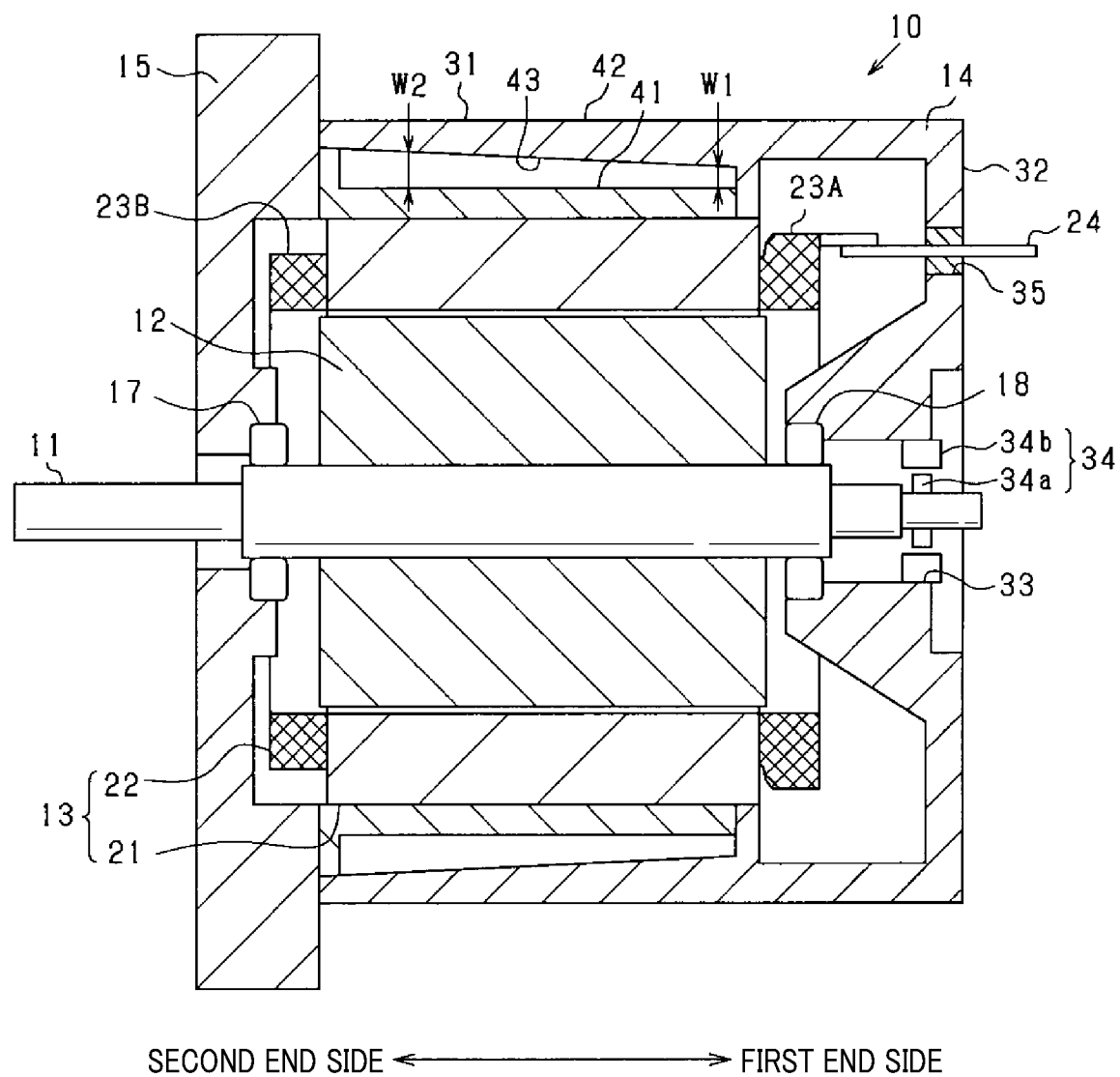
FIG. 1 is a diagram showing a vertical cross-sectional view of a rotary electric machine according to the present disclosure.

A rotary electric machine according to the present embodiment is configured as an inner-rotor type (inner rotation type) multi-phase AC motor. The overall configuration is shown in FIG. 1. FIG. 1 is a vertical cross-sectional diagram showing a vertical cross section of the rotary electric machine 10 in a direction along a rotary shaft 11 of the rotary electric machine 10. The rotary electric machine 10 is configured as a synchronous motor or an induction motor. In the following description, a direction in which the rotary shaft 11 extends is defined as an axial direction, a direction radiating with respect to the rotary shaft 11 as a center thereof is defined as a radial direction, and a direction parallel to a circumference with respect to the rotary shaft 11 as the center thereof is defined as a circumferential direction.

The rotary electric machine 10 includes a rotor 12 rotatably disposed to the rotary shaft 11, a stator 13 disposed in a position surrounding the rotor 12, a housing 14 that accommodates the rotor 12 and the stator 13, and a cover 15 fixed to the housing 14 at one end side in the axial direction thereof. The rotor 12 and the stator 13 are arranged coaxially with respect to the rotary axis to face each other in the radial direction. The housing 14 has a bottomed cylindrical shape that opens in one end side in the axial direction. The cover 15 is attached to the end portion of the opening by a fastening member such as a bolt which is not shown.

The rotor 12 includes a rotor core fixed to the rotary shaft 11 in which a plurality of electromagnetic steel plates are laminated in the axial direction, and a plurality of permanent magnet supported by the rotor core. The stator 13 is provided with an annular shaped stator core 21, a multi-phase winding 22 integrated to the stator core 21 as being wounded around the stator core 21. For the stator core 21, the electromagnetic steel plates each having an annular shape are laminated in the axial direction and fixed by caulking or the like, thereby constituting the stator core 21. The stator winding 22 is, for example, three phase windings composed of a U-phase winding, V-phase winding, and a W-phase winding which are star-connected (Y-connection). Alternatively, the stator 22 may be configured such that the three-phase windings are connected by Δ-connection.

The housing 14 includes a cylindrical portion 31 having a cylindrical shape in which the stator 13 is assembled radially inside and an end plate portion 32 disposed in the opposite side of the cover 15 between both sides of the cylindrical portion 31 in the axial direction. The stator 13 is fixed to the cylindrical portion 31 of the housing 14, with a fixing margin, by means of a thermal insertion, a press fitting or the like.

A through hole 33 is formed in the end plate portion 32 to have the rotary shaft 11 inserted therethrough. In the through hole 33, a bearing 18 in a pair of bearings 14 and 18 is fixed. Also, a rotation sensor 34 is provided in the through hole 33 to detect a rotational state of the rotor 12. The rotation sensor 34 is configured as an electromagnetic induction type rotation angle sensor composed of a resolver for example, and includes a resolver rotor 34a fixed to the rotational shaft 11 and a resolver stator 34b disposed radially outside the resolver rotor 34a facing each other. The resolver rotor 34a having a disk-ring shape is provided coaxially on the rotary shaft 11, the rotary shaft 11 being inserted to the resolver rotor 34a. The resolver stator 34b includes a stator core and stator coil which are not shown. The resolver stator 34b is fixed to the end plate portion 32 of the housing 14.

At the both end sides of the stator winding 22 in the axial direction, coil ends 23A and 23B are provided. At one end side in the both ends, specifically, at the coil end 23A provided in the end plate portion 32 of the housing 14, the three-phase windings are connected to the neutral point. The three-phase windings may be mutually connected by a neutral point bus bar. A winding terminal 24 for each winding is connected to the coil end 23A. The winding terminal 24 is extended outside the housing 14 from a hole 35 provided in the end plate portion 32, and a power harness (not shown) is connected to the winding terminal 24.

According to the present embodiment, among an end plate portion 32 side and a cover 15 side of the housing 14 in the axial direction of the rotary electric machine 10, the end plate 13 side is referred to as first end side and the cover 15 side is referred to as second end side. The rotation sensor 34, the neutral point bus bar of the stator winding 22 and the winding terminal 24 are provided in the first end side among the first end side and the second end side According to the rotary electric machine 10 having the above-described structure, an energization state of the stator winding 22 is controlled by an inverter or a control unit which are not shown, and this energization control controls the torque during the power running state and the power generation state.

Further, the rotary electric machine 10 has a cooling structure using a coolant such as cooling water or the like. Hereinafter, the cooling structure will be described. As the coolant, liquid such as lubricating oil can be used other than the cooling water.

The cylindrical portion 31 includes, in the housing 14, an inner wall portion 41 and an outer wall portion 42 which face inwardly/outwardly in the radial direction in a state where they are apart from each other. A cooling passage 43 having an annular shape is provided between the inner wall portion 41 and the outer wall portion 42 to allow the coolant to flow therethrough. According to the present embodiment, the inner wall portion 41 and the outer wall portion 42 are composed of mutually different members, and an inner cylindrical portion that forms the inner wall portion 41 and an outer wall portion that forms the outer wall portion 42 are assembled inwardly and outwardly respectively in the radial direction. Hence, the cooling passage 43 is formed.

In the case of the inner-rotor type rotary electric machine 10, the inner wall portion 41 is a wall portion of the stator 13 side, and the outer wall portion 42 is a wall portion of a counter stator side. The cooling passage 43 is provided at a position overlapping with the stator core 21 in the axial direction and located in parallel to the stator core 21 inwardly/outwardly with respect to the radial direction. At the both ends of the coolant passage 43 in the axial direction, the inner wall portion 41 and the outer wall portion 42 are unified, thereby closing the coolant passage 43.

Figure 2:
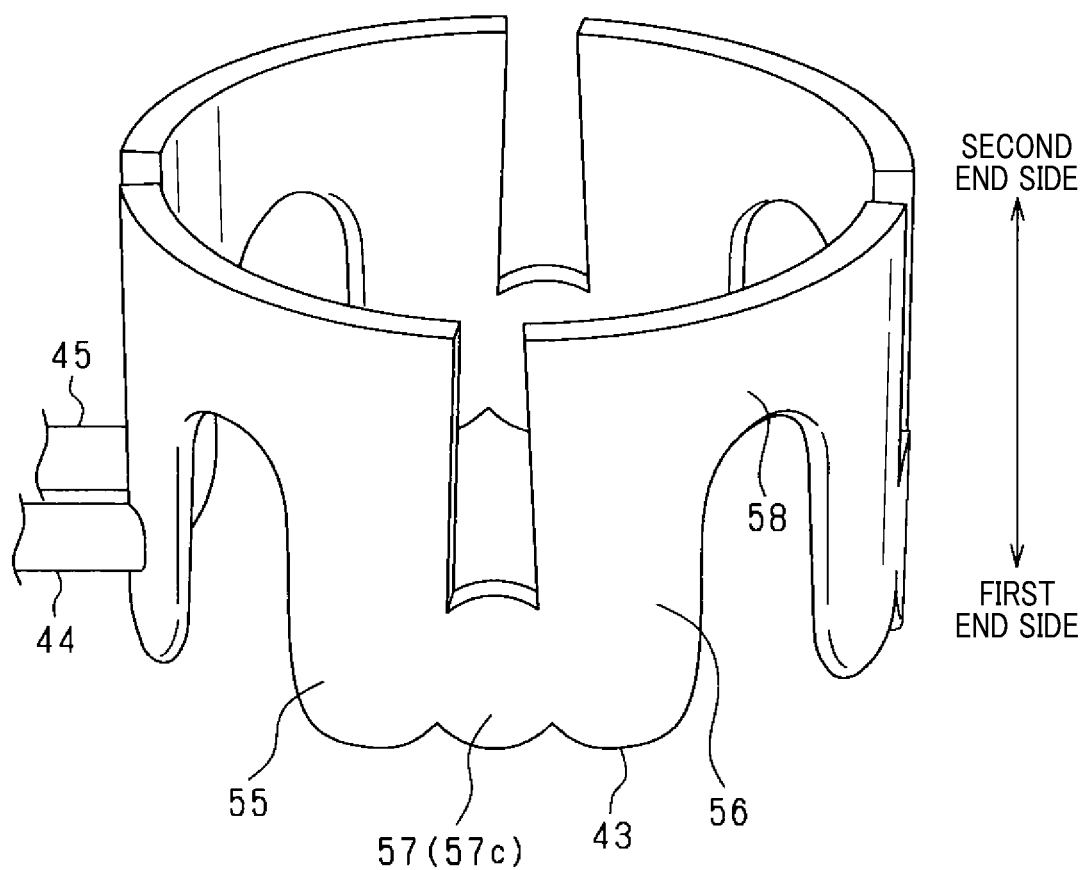
FIG. 2 is a diagram showing a perspective view of a coolant passage where the coolant passage is only taken out from the housing.
Figure 3:
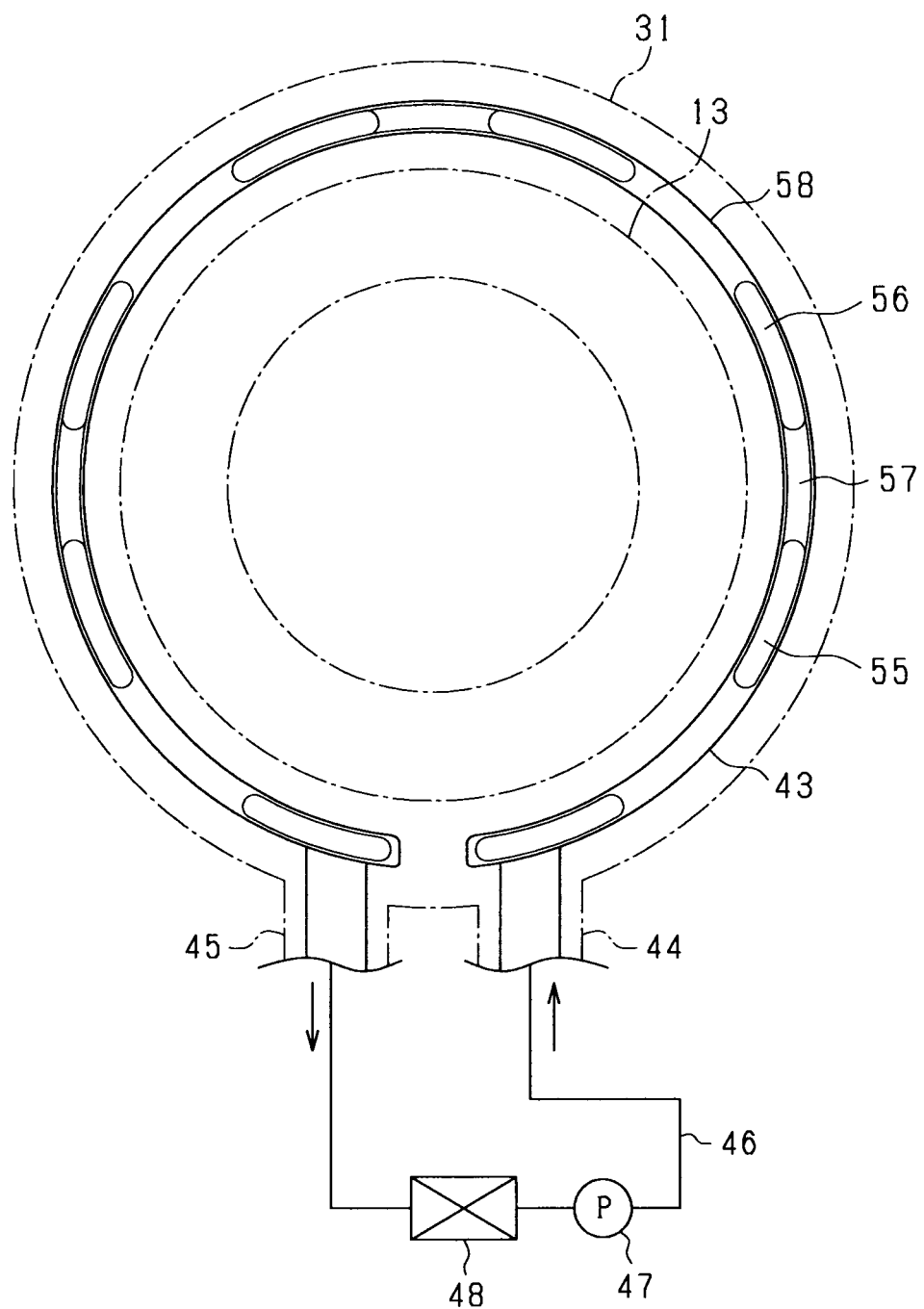
FIG. 3 is a diagram showing a plan view of the coolant passage when viewed from a first end side in the axial direction.
Figure 4:
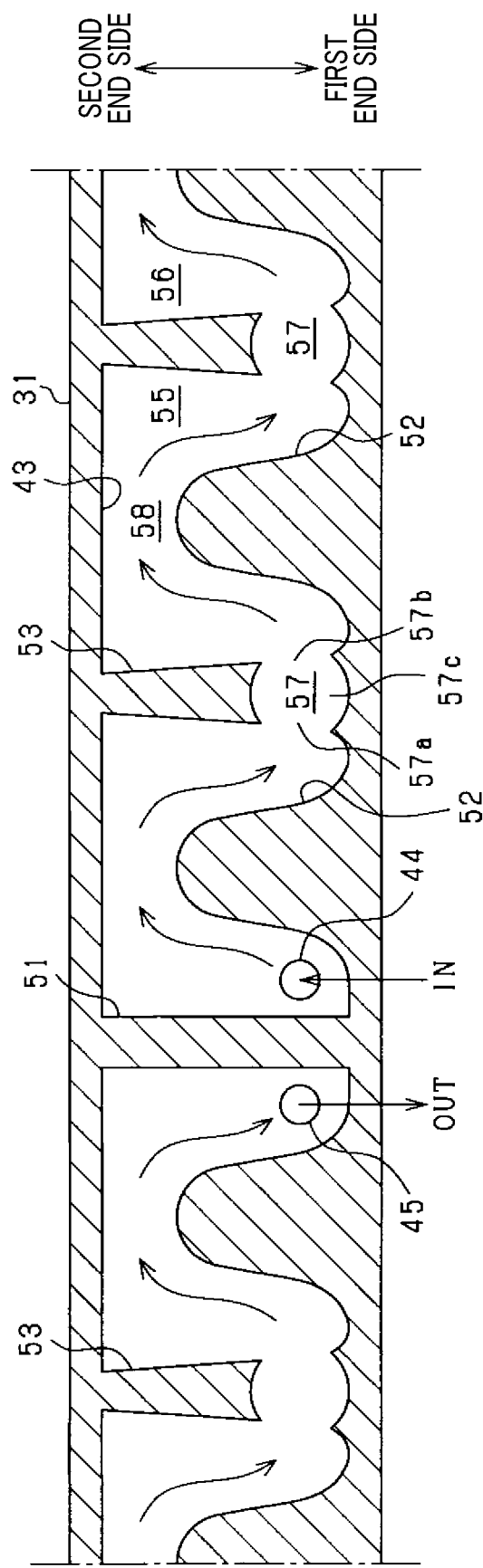
FIG. 4 is a diagram showing a cross-sectional view of a cylindrical portion in which the coolant passage having an annular shape is plane-expanded.

Hereinafter, the coolant passage 43 will be described in more detail. FIG. 2 is a diagram showing a perspective view of a coolant passage 43 where the coolant passage 43 is only taken out from the housing 14, and FIG. 3 is a diagram showing a plan view of the coolant passage 43 when viewed from a first end side in the axial direction. In FIG. 3, the stator 13 and the cylindrical portion 31 of the hosing 14 are indicated by an imaginary line (dashed line). FIG. 4 is a diagram showing a cross-sectional view of a cylindrical portion 31 in which the coolant passage 43 having an annular shape is plane-expanded. In FIG. 2 and FIG. 4, the lower side is the first end side and the upper side is the second end side.

The coolant passage 43 is formed as a passage through which the coolant circularly flows around the stator 13, where the coolant circulates within the coolant passage 43 via the input port 44 and the output port 45 provided in the cylindrical portion 31. As shown in FIG. 3, a coolant pipe 46 forming the circular passage is connected to the respective ports 44 and 45, and a pump 47 and a heat radiation unit 48 is connected to the coolant pipe 46. The pump 47 is configured as an electric pump for example. The heat radiation unit 48 is configured as, for example, a radiator that radiates heat of the coolant. The coolant flows into the coolant passage 43 via the input port 44 from the coolant pipe 46, and flows out to the coolant pipe 46 after circulating the coolant passage 43 from the output port 45. Also, the coolant flows into the coolant passage 43 via the input port 44 after being cooled in the coolant pipe 46.

The coolant passage 43 is configured to allow the coolant to flow meandering in the axial direction around the stator 13. Specifically, the coolant flows back and forth between one end side and the other end side in the axial direction within the cylindrical portion 31 of the housing 14. More specifically, as shown in FIG. 4, the cylindrical portion 31 is provided with a plurality of dividing portions arranged in the circumferential direction, extending in the axial direction. The dividing portions 51 to 53 allow the coolant to circulate in the coolant passage 43 such that the coolant returns back to change the flow-direction at the one end side and the other end side of the cylindrical portion 31 in the axial direction.

The dividing portions 51 to 53 may be formed to extend towards the radial direction from either the inner wall portion 41 or the outer wall portion 42 which form the cylindrical portion 31. Further, the dividing portions 51 to 53 may be each composed of a protrusion that protrudes in the radial direction from the inner wall portion 41 and the outer wall portion 42.

The dividing portions 51 to 53 are composed of a first dividing portion 51 provided to connect the first end side and the second end side, a second dividing portion 52 provided to extend in the axial direction from the first end side and be broken in the second end side, and a third dividing portion 53 provided to extend in the axial direction from the second end side and be broken in the first end side. Among these portions, the first dividing portion 51 is provided to divide between the input port 44 side and the output port 45 side in the circumferential direction within the coolant passage 43. The second dividing portion 52 is provided to return back to change the flow-direction of the coolant at the second end side in the coolant passage 43. The third dividing portion 53 is provided to return back to change the flow-direction of the coolant at the first end side in the coolant passage 43. In FIG. 4, the flow direction of the coolant in the coolant passage 43 is indicated by an arrow.

The coolant passage 43 includes axial direction passages 55 and 56 through which the coolant flows in the axal direction, and circumferential direction passages 57 and 58 thorough which the coolant flows. The axial direction passage 55 and 56 are arranged alternately in the circumferential direction, and the circumferential direction passage 57 and 58 are arranged alternately in the circumferential direction. In this case, the coolant flow towards the first end side from the second end side in the axial direction, then flows through the circumferential direction passage of the first end side in the circumferential direction. Thereafter, the coolant flows through the axial direction passage 56 from the first end side to the second end side in the axial direction, then flows through the circumferential passage 58 of the second end side in the circumferential direction. Note that the circumferential direction passage 57 of the first end side among the circumferential passages 57 and 58 corresponds to end side passage.

Further, according to the present embodiment, the passage width in the radial direction in the coolant passage 43 (thickness dimension in the radial direction) varies depending on positions in the axial direction. For example, referring to FIG. 1, in the first end side (i.e. end plate portion 32 side of the housing 14), the passage width W1 of the coolant passage 43 in the radial direction is small, and in the second end side (i.e. cover 15 side), the passage width W2 of the coolant passage 43 in the radial direction is large. In FIG. 1, the passage widths are defined as W1<W2. Since FIG. 3 shows the coolant passage 43 when viewed from the first end side in the axial direction, the passage width shows narrower in the near side. In this case, for the coolant flow shown in FIG. 4, the flow rate becomes low when the coolant flows through the second end side having large area of the passage opening, and becomes high when the coolant flows through the first end side having small area of the passage opening. Hence, when the coolant flows through the coolant passage 43, a flow rate distribution is formed in which the flow rate changes depending on the position in the coolant passage 43.

As described above, the flow rate of the coolant in the coolant passage 43 is varied in the axial direction, whereby the cooling ability differs between the first end side and the second end side in the housing 14. In this case, since the flow rate in the first end side is higher than that of the second end side, the cooling ability is enhanced. In the rotary electric machine 10, since the rotation sensor 34 is provided at the first end side and the flow rate at the first end side is high, the rotation sensor 34 is appropriately cooled and the detection accuracy can be maintained.

It is considered that the cooling ability is expected to be enhanced at the first end side in the coolant passage 43 since the flow rate of the coolant at the first end side becomes high. However, the passage width of the radial direction is narrowed at the first end side compared to that of the second end side, whereby a flow separation occurs in the vicinity of the wall surface of the axial direction passages 55 and 56. As a result, the coolant flow may stagnate. More specifically, there is a concern that flow stagnation may occur in a curved portion where the flow direction of the coolant changes from the axial direction to the circumferential direction and a curved portion where the flow direction of the coolant changes from the circumferential direction to the axial direction. In this case, the coolant (hot water) of which the temperature has increased in the coolant passage 43 is stagnated in a stagnated portion formed in the coolant passage 43. Accordingly, the cooling efficiency may be lowered.

For this reason, according to the present embodiment, the circumferential direction passage 57 is configured such that the passage width of the input portion 57a in the upstream side and the passage width of the output portion 57b in the downstream side is narrowed and the passage width in the axial direction at an intermediate portion 57c between the upstream side and the downstream side is expanded. Thus, when the coolant flowing through the coolant passage 43 passes through the circumferential direction passage 57 and returns back to change its direction to the axial direction, the flow rate decreases due to a change in the area of the passage opening in the circumferential passage portion 57, thereby suppressing stagnation in the curved portion (i.e. first end side in the axial direction passages 55 and 56) where the flow direction of the coolant changes between the axial direction and the circumferential direction.

Figure 5:
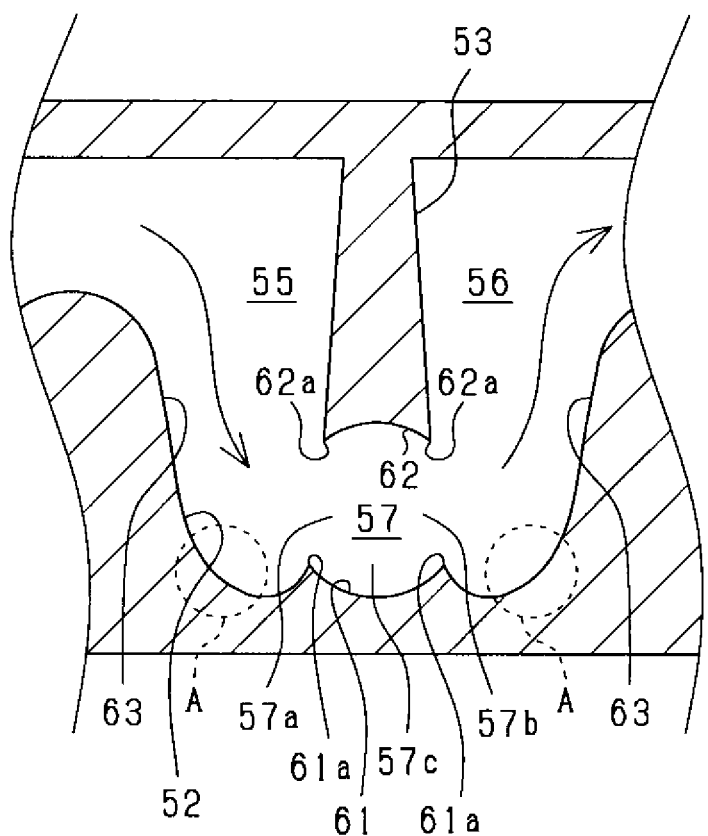
FIG. 5 is a diagram showing a cross-sectional view in which a configuration of a circumferential passage portion in the coolant passage is expanded.

The detailed configuration of the circumferential direction passage 57 will be described with reference to FIG. 5. The circumferential direction passage 57 is divided in the axial direction by the passage walls 61 and 62 located at both sides in the axial direction and facing each other. These passage walls 61 and 62 are each formed to have an arc shape in which the convex part is oriented outwards the passage, whereby the passage width of the intermediate portion 57c in the axial direction is expanded. Note that the passage wall 62 is formed by the tip end surface of the second dividing portion 52. In this case, the intermediate portion 57c of the circumferential passage 57 has a shape in which the passage width is expanded at both sides in the axial direction with respect to the input portion 57a and the output portion 57b. Thus, the area of the passage opening at the intermediate portion 57c is expanded to be larger than those of the input portion 57a and the output portion 57b.

Also, in this case, at the passage wall 61 in the outer side in the axial direction, a pair of protrusion 61a protruding the inner side in the axial direction (i.e. opposed passage wall 62 side) are formed, and a pair of protrusion 62a protruding the outer side in the axial direction (i.e. opposed passage wall 61 side) are formed. These protrusions 61a and 62a make the passage width in the axial direction narrower with the input portion 57a and the output portion 57b.

In the coolant passage 43, the passage widths of the axial direction passages 55 and 56 are changed such that the closer to the first end side from the second end side, the narrower the passage widths are. Specifically, the passage wall 63 that divides the axial direction passages 55 and 56 in the circumferential direction, that is, the passage wall 63 serving as a side wall in the circumferential direction of the dividing portions 52 and 53, is provided to be located obliquely with respect to the axial direction. Thus, the passage width of the axial direction passages 55 and 56 in the circumferential direction becomes gradually narrower towards the first end side from the second end side.

The axial direction passages 55 and 56 are connected to the axial direction passage 57 in which the coolant flow is returned depending on the connection between the respective passages 55 to 57. In this case, in the axial direction passages 55 and 56, the outer periphery side passage walls (A portion in FIG. 5) are formed to have an arc shape at a returned portion in the first end side. Note that A portion may not be formed in an arc shape but may be formed in a chamfered shape.

Hereinafter, effects and advantages of the rotary electric machine 10 according to the present embodiment will be described.

According to the rotary electric machine 10 described above, the coolant passage 43 in the cylindrical portion 31 of the housing 14 is formed to meander in the axial direction, and the passage width of the coolant passage in the first end side in the radial direction is narrower than the passage width in the radial direction in the second end side. In this case, since the passage width of the coolant passage 43 in the first end side in the radial direction is narrower than that of the second end side, the flow rate of the coolant in the first end side becomes higher. Thus, the configuration has advantages in cooling the rotation sensor 34 disposed in the first end side.

Further, the circumferential direction passage 57 where the coolant flows in the circumferential direction is provided in the first end side of the coolant passage 43, and the circumferential direction passage 57 is configured such that the passage opening area of the intermediate portion 57c between the input portion 57a and the output portion 57b is expanded compared to the input portion 57a and the output portion 57b. According to the configuration, the coolant flowing through the coolant passage 43 flows meandering along the coolant passage 43, in which the flow rate decreases due to a change in the passage opening area in the circumferential passage 57, when the coolant passes the intermediate portion 57c of the circumferential direction passage 57 in the first end side as the axial direction end portion and returns back in the axial direction. In this case, the flow rate decreases at the circumferential direction passage portion 57, thereby suppressing occurrence of the coolant being stagnated due to the flow separation in the vicinity of the wall surface of the axial direction passages 55 and 56 (i.e. stagnation at a curved portion where the flow direction of the coolant changes between the axial direction and the circumferential direction in the first end side) so that the cooling ability in the first end side can be prevented from being lowered. As a result, the rotation sensor 34 in the rotary electric machine can be appropriately cooled.

Further, at the first end side in the rotary electric machine, a neutral point bus bar and a winding terminal 24 of the stator winding other than the rotation sensor 34 is provided, and these components can be also cooled appropriately.

Moreover, according to the above-described configuration, stagnation is suppressed at a portion where the flow direction of the coolant in the first end side is changed between the axial direction and the circumferential direction. Hence, assuming a case where an air bubble flows into the coolant passage 43, and the bubble stays in the stagnated area and lowers the cooling efficiency, the configuration of the present disclosure is able to avoid the above-mentioned problem.

Also, since the passage width of the coolant passage 43 in the radial direction is expanded compared to that of the first end side, the pressure loss in the second end side can be suppressed. Hence, the operating load of the pump 47 that allows the coolant to flow through the coolant passage 43 can be suppressed.

In the circumferential direction passage 57, the passage width at the input portion 57a and the output portion 57b in the axial direction is narrow and the passage width of the intermediate portion 57c in the axial direction is expanded. Hence, the passage opening area of the intermediate portion 57c is larger than that of the input portion 57a and the output portion 57b. In this case, the circumferential direction passage 57 serves as a return back portion in the axial direction in the coolant flow, and since the passage width of the intermediate portion 57c of the circumferential passage 57 in the axial direction is expended, the coolant readily flows into the expanded portion. Thus, the flow rate of the coolant can be reliably decreased at the circumferential passage 57 so that an effect of suppressing the stagnation of the coolant in the vicinity of the wall surface of the axial direction passages 55 and 56 can be enhanced.

The intermediate portion 57c of the circumferential passage 57 is configured such that the passage width thereof in the axial direction is expanded with respect to the input portion 57a and the output portion 57b. Thus, the effect of reducing the flow rate of the coolant at the circumferential direction passage 57 can be enhanced.

The passage walls 61 and 62 of the circumferential direction passage 57 at both sides in the axial direction is designed to have an arc shape in which the convex part is oriented outwards the passage, thereby expanding the passage width of the intermediate portion 57c in the axial direction. In this case, the coolant is prompted to pass through the intermediate portion 57c of the circumferential passage 57 towards the downstream side, while stagnation (disturbance) occurs on the coolant flow. Thus, the coolant (hot water) where the temperature has increased can be prevented from being stagnated as much as possible.

In the cylindrical portion 31 of the housing 14, the protrusion 61a protruding inwardly in the axial direction is formed on the passage wall 61 located at an outward portion of the circumferential direction passage 57 in the axial direction. The protrusion 61a makes the passage width in the axial direction narrower with the input portion 57a and the output portion 57b. In the case where the coolant returns back in the axial direction at the first end side in the coolant passage 43, the coolant flows along the outer periphery side of the passage, that is, the passage wall 61 located at an outward portion of the circumferential direction passage 57 in the axial direction. Since the protrusion 61a is formed on the passage wall 61 located at an outward portion of the circumferential direction passage 57 in the axial direction, compared to a configuration in which the protrusion 61 is not formed on the passage wall 61, the effect of reducing the flow rate of the coolant at the circumferential direction passage 57 can be enhanced.

The passage widths of the axial direction passages 55 and 56 in the circumferential direction is changed such that the closer to the first end side from the second end side, the narrower the passage widths are. Also, the outer periphery side passage walls in the returned portion in the first end side is formed in an arc shape or a chamfered shape.

A region in the first end side in the axial direction passages 55 and 56 is a region where the flow direction of the coolant changes to the circumferential direction from the axial direction or the flow direction of the coolant changes to the axial direction from the circumferential direction. According to the above-described configuration, the coolant flow becomes smooth in the region where the flow direction of the coolant is changed between the axial direction and the circumferential direction, whereby the flow separation from the passage wall can be suppressed. Thus, the cooling performance at the first end side can be enhanced.

Other Embodiments

The above-described embodiments can be modified as follows.

Figure 6:
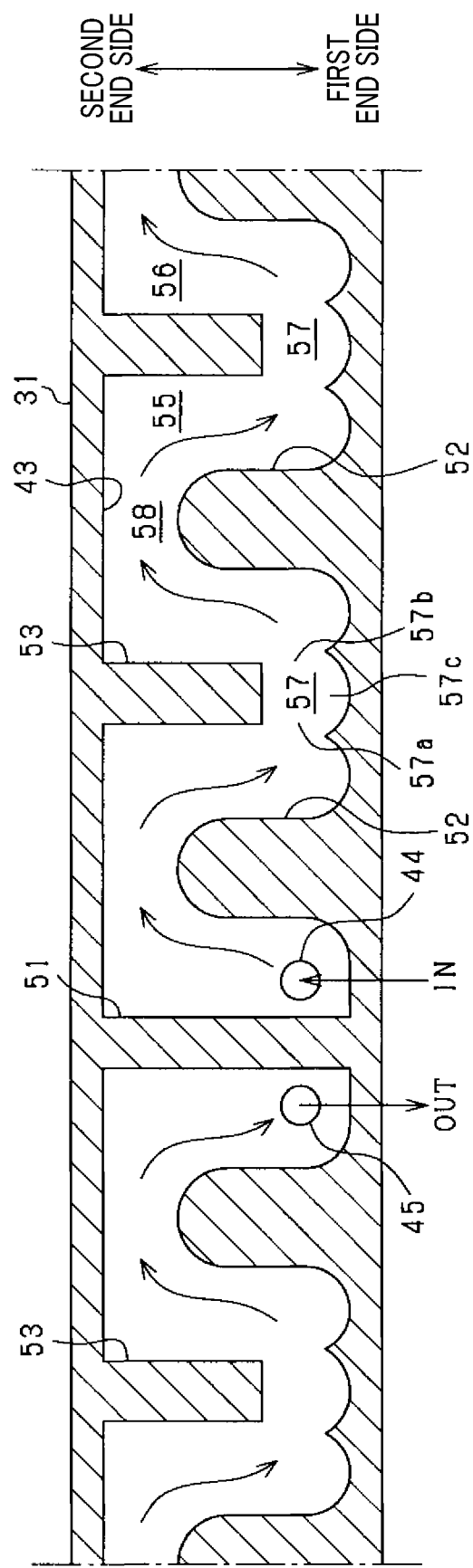
FIG. 6 is a diagram showing a cross-sectional view of the cylindrical portion in which the coolant passage having an annular shape of another example is plane-expanded.

The rotary electric machine 10 according to the above-described embodiment is configured as shown in FIG. 4, such that the passage walls 61 and 62 of the circumferential passage 57 at the both sides in the axial direction each has an arc shape in which the convex part is oriented outwards the passage. However, this configuration can be modified. For example, either the passage wall 61 or the passage wall 62 may be formed in an arc shape in which the convex part is oriented outwards the passage. In FIG. 6, a configuration is shown in which only the passage wall 61 among the passage walls 61 and 62 at both sides in the axial direction. In this case, the passage width may preferably be expanded outwards the passage among the outward passage and the inward passage in the axial direction. Moreover, in the circumferential direction passage 57, the passage walls 61 and 62 may be formed to protrude in a polygonal shape (e.g. triangle shape or rectangular shape).

In FIG. 6, a part of the configuration has been modified other than the above-described modification, which can be appropriately used as another examples. In other words, the passage wall as a circumferential side surface of the dividing walls 52 and 53 is formed parallel to the axial direction.

Figure 7:
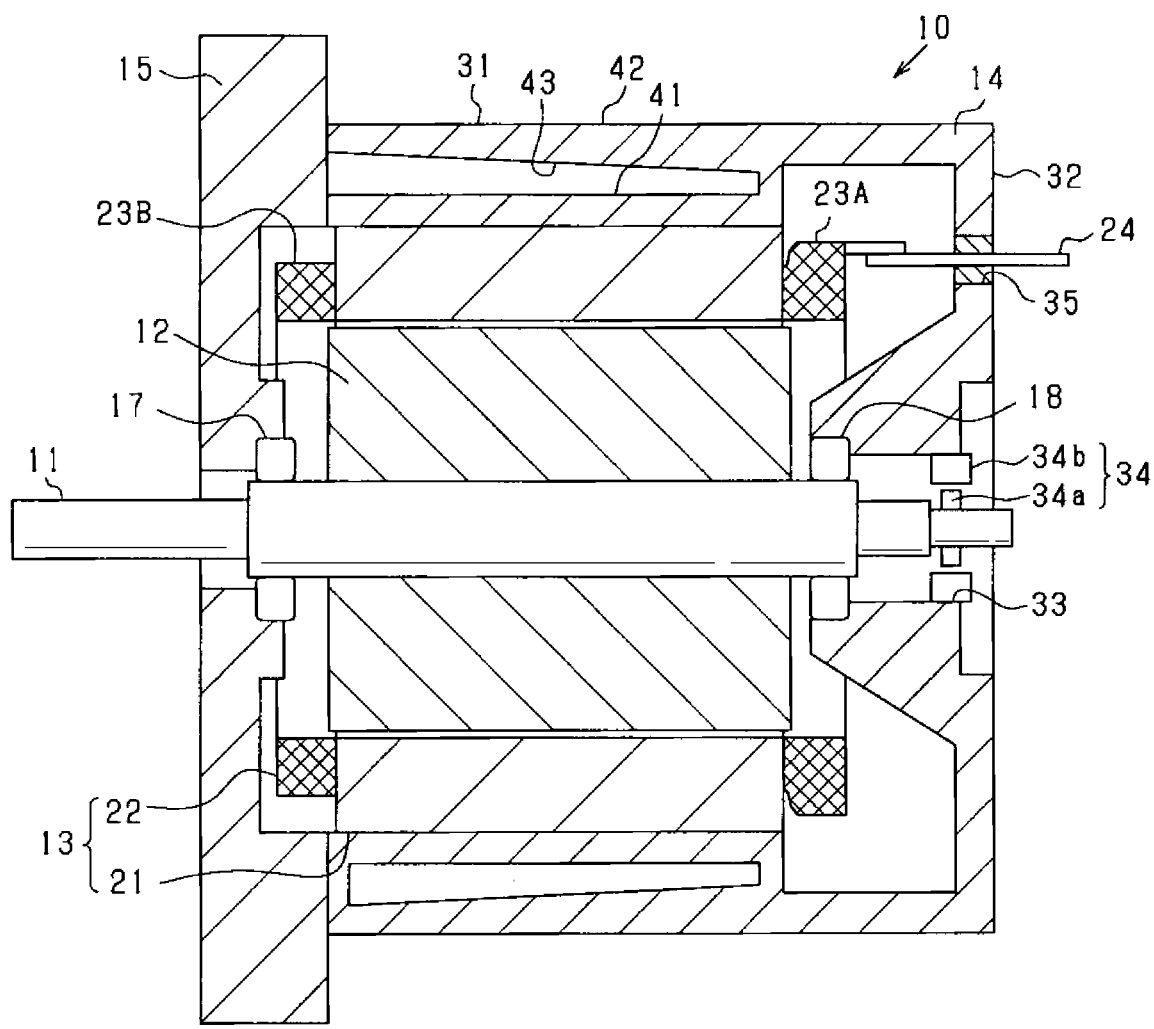
FIG. 7 is a diagram showing a vertical cross-sectional view of a rotary electric machine of another example.

As shown in FIG. 7, in the housing 14, the inner wall portion 41 and the outer wall portion 42 in the cylindrical portion 31 may be formed with an integrated member instead of different members. In this case, the housing 14 may be formed by casting using a casting core.

Figure 8:
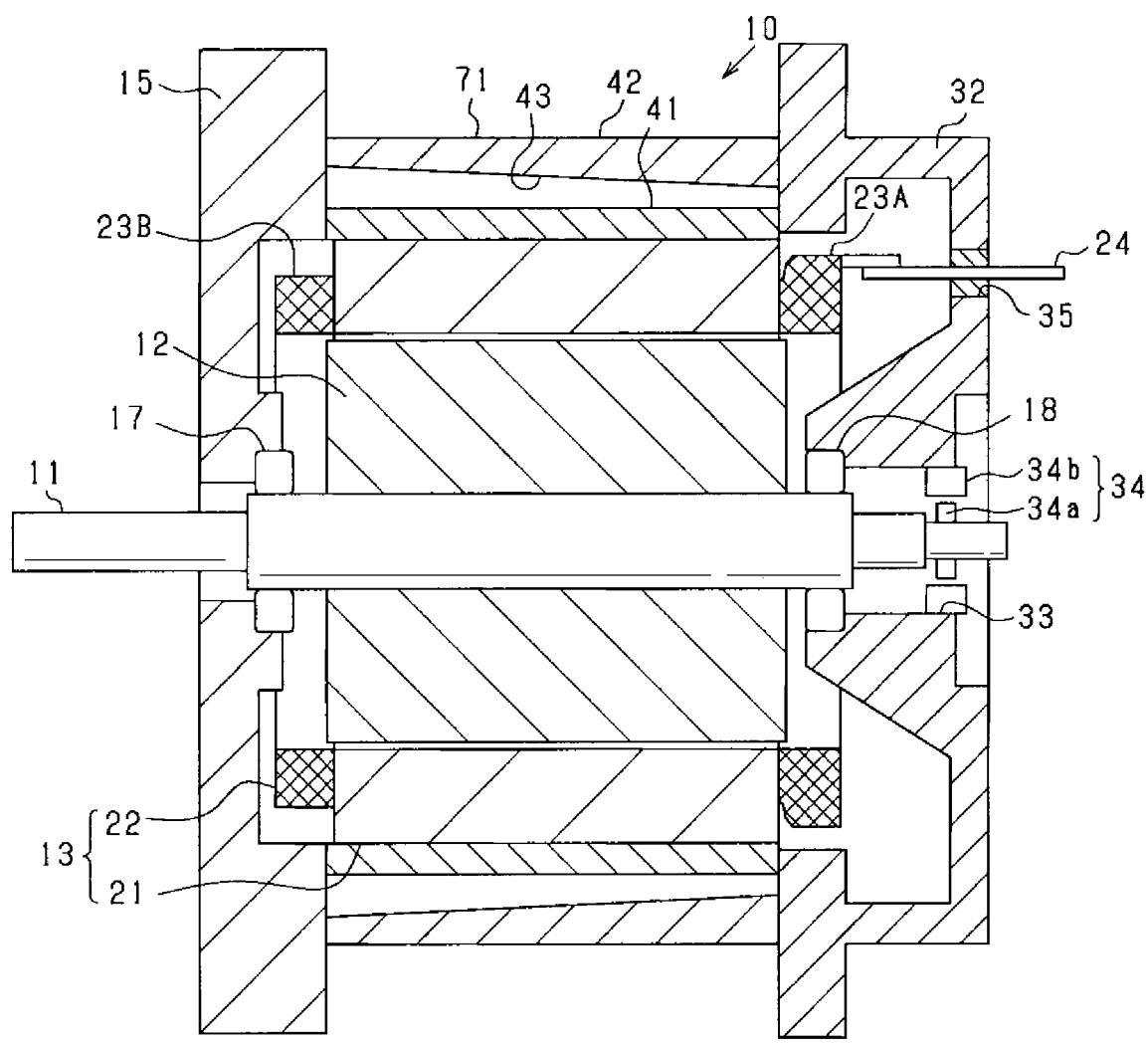
FIG. 8 is a diagram showing a vertical cross-sectional view of a rotary electric machine of another example.

Further, as shown in FIG. 8, in the housing 14, the cylindrical portion 31 and the end plate portion 32 are configured of mutually different members, and these members are coupled by a fastening member (not shown) such as a bolt.

Figure 9A:
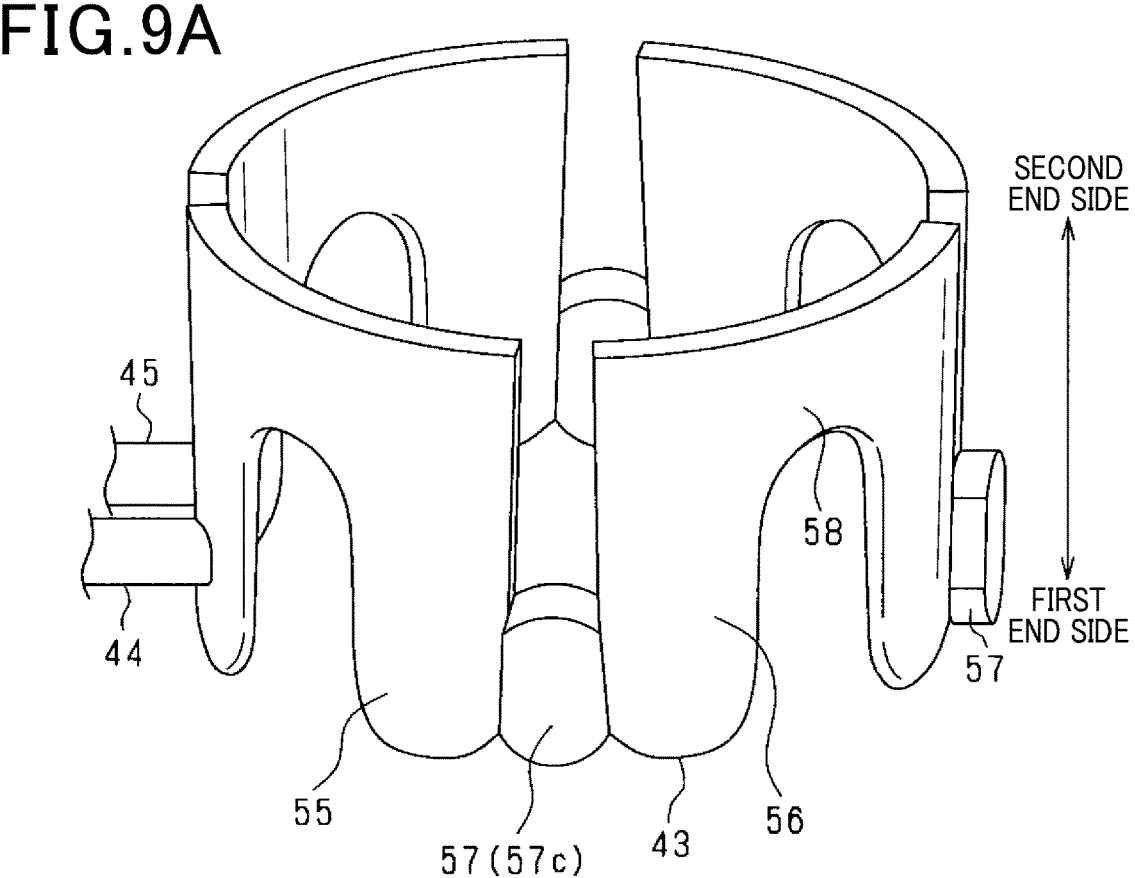
FIG. 9A is a diagram showing a perspective view of the coolant passage of another example.
Figure 9B:
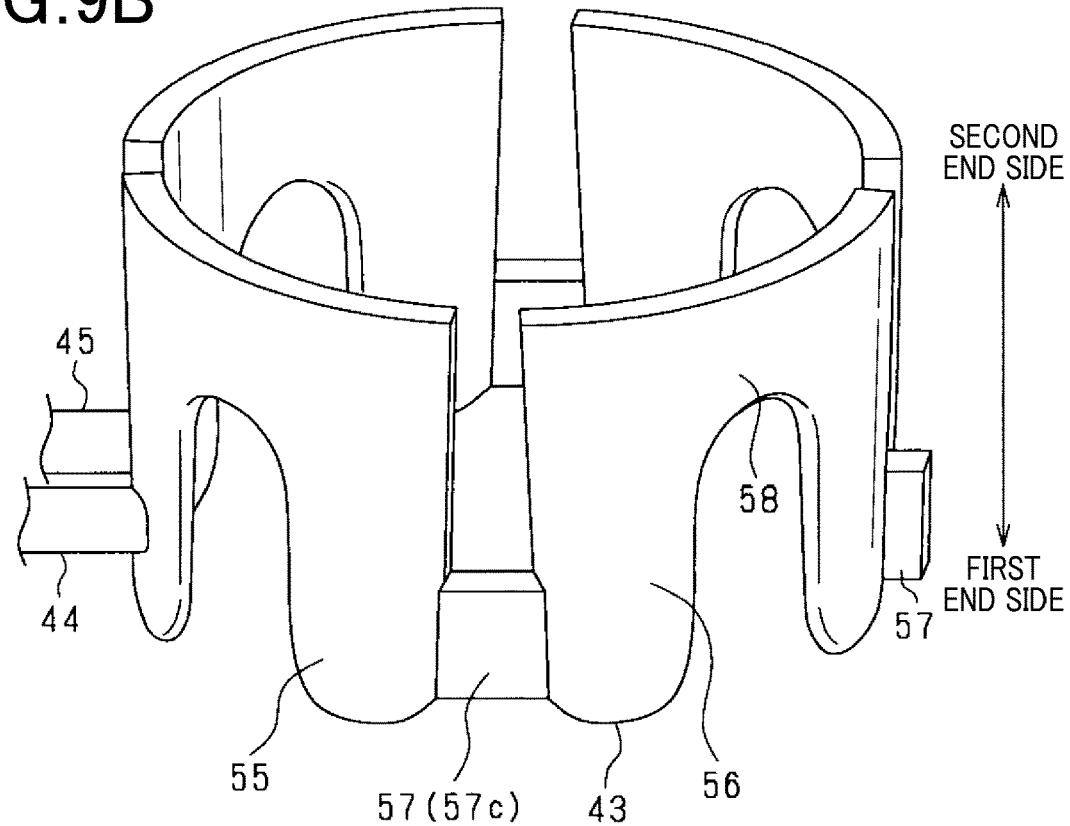
FIG. 9B is a diagram showing a perspective view of the coolant passage of another example.

The coolant passage 43 may be configured as shown in FIG. 9A, 9B. In these FIGS. 9A and 9B, the passage width in the radial direction is expanded at the intermediate portion 57 compared to the passage widths of the input portion 57a and the output portion 57b. In this case, in the circumferential passage 57, the coolant flows into the expanded portion expanded in the radial direction, whereby the flow rate of the coolant in the circumferential passage 57 can be lowered. Here, FIG. 9A shows a configuration in which the intermediate portion 57c is expended in the axial direction and the radial direction. FIG. 9B shows a configuration in which the intermediate portion 57c a configuration in which the intermediate portion 57c is expanded in the radial direction.

In the case where the passage width of intermediate portion 57c in the radial direction is expanded, the passage width may be expanded radially outside not radially inside. In this case, compared to a case where the passage width is expanded radially inside, the coolant readily flows into the expanded portion of the circumferential passage 57, surely lowering the flow rate of the coolant at the circumferential passage 57. Hence, an effect of suppressing the stagnation of the coolant in the vicinity of the wall surface of the axial direction passages 55 and 56 can be enhanced.

According to the above-described embodiments, the end plate portion 32 of the housing 14 in the axial direction of the rotary electric machine 10 is defined as the first end side and the cover 15 side is defined as the second end side. However, these definitions may be changed such the cover 15 side is defined as the first end side and the end plate side is defined as the second end side. In this case, the rotation sensor 34, the neutral point bus bar of the stator winding 22 and the winding terminal 24 may be provided in the cover 15 side.

As the coolant flowing through the coolant passage 43, a gas can be used.

According to the above-described embodiments, inner rotor type rotary electric machine is utilized for an example. Alternatively, outer rotor type rotary electric machine can be applied to the present disclosure. In the outer rotor type rotary electric machine, as is well known, the rotor 12 is disposed facing the stator 13 and being located radially outside the stator 13. In this case, the cylindrical portion 31 of the housing 13 is attached radially outside the stator 13. Similar to the above-described embodiments, the coolant passage 43 is disposed between the inner wall portion 41 and the outer wall portion 42 in the cylindrical portion 31.

CONCLUSION

As described, the present disclosure provides a rotary electric machine provided with a cooling structure, which improves a cooling performance of the rotational sensor in the cooling structure of the rotary electric machine.

As a first aspect of the present disclosure, a rotary electric machine is provided with a rotor rotatably provided together with a rotary shaft, the rotary electric machine having a first end side and a second end side, the first end side being one end side of the rotary electric machine in an axial direction of the rotor, the second end side being the other side of the rotary electric machine in the axial direction of the rotor; a stator disposed facing the rotor in a radial direction thereof; a housing having a cylindrical portion in which the stator is assembled radially inside or outside the rotor; and a rotation sensor disposed in the first end side among the first end side and the second end side, the rotation sensor detecting a rotational state of the rotor.

The cylindrical portion includes an inner wall portion and an outer wall portion mutually facing inwardly/outwardly in the radial direction, a coolant passage having an annular shape is provided between the inner wall portion and the outer wall portion to allow a coolant to flow through the coolant passage; the coolant passage is formed to meander in the axial direction, and a passage width of the coolant passage in the first end side in the radial direction is narrower than a passage width of the coolant passage in the second end side in the radial direction; an end side passage is provided in the first end side, the coolant flowing through the end side passage in a circumferential direction; and the end side passage is configured such that a passage opening area of an intermediate portion between an input portion in an upstream side of the coolant passage and an output portion in a downstream side of the coolant passage is expanded compared to those of the input portion and the output portion.

According to the above-described rotary electric machine, a rotation sensor is disposed in the first end side between the first and second end sides as one end side of the rotary electric machine in the axial direction. In order to maintain the detection accuracy of the rotation sensor, influence of the heat produced by the rotary electric machine may preferably be avoided. In this respect, in the cylindrical portion of the housing, a coolant passage having an annular shape is provided between the inner wall portion and the outer wall portion which face each other inwardly and outwardly in the radial direction. The coolant passage is formed meandering in the axial direction, and a passage width of the coolant passage in the first end side in the radial direction is narrower than that of a passage width of the coolant passage in the second end side in the radial direction. In this case, the passage width of the first end side in the radial direction is narrowed so that the flow rate of the coolant in the first end side becomes faster. Hence, this configuration has an advantage in cooling the rotation sensor provided in the first end side.

However, according to a configuration in which the passage width in the first end side in the radial direction is narrowed as described above, a flow separation occurs in the vicinity of the wall surface of the coolant passage, whereby stagnation may be caused in the coolant flow. More specifically, there is a concern that flow stagnation may occur in a curved portion where the flow direction of the coolant changes from the axial direction to the circumferential direction and a curved portion where the flow direction of the coolant changes from the circumferential direction to the axial direction. In this case, the coolant (hot water) of which the temperature has increased in the coolant passage is stagnated in a stagnated portion formed in the coolant passage 43. Accordingly, the cooling efficiency may be lowered.

In this respect, the end side passage in which the coolant flows in the circumferential direction is provided at the first end side in the coolant passage, and the end side passage is configured such that the passage opening area of the intermediate portion between the input portion in an upstream side of the coolant and the output portion in a downstream side of the coolant is expanded compared to those of the input portion and the output portion. According to the configuration, the coolant flows meandering along the coolant passage in which the flow rate decreases due to a change in the passage opening area in the end side passage, when the coolant passes the end side passage in the first end side as the axial direction end portion (i.e. intermediate portion of the end side passage) and returns back in the axial direction. In this case, the flow rate decreases at the end side passage, thereby suppressing occurrence of the coolant being stagnated due to the flow separation in the vicinity of the wall surface of the coolant passage (i.e. stagnation at a curved portion where the flow direction of the coolant changes between the axial direction and the circumferential direction in the first end side) so that the cooling ability in the first end side can be prevented from being lowered. As a result, the rotation sensor in the rotary electric machine can be appropriately cooled.

As a second aspect of the present disclosure, the end side passage is configured in the first aspect, such that a passage width of the input portion and a passage width of the output portion narrowed and a passage width in the axial direction at the intermediate portion is expanded.

According to the above-described configuration, in the end side passage, the passage width of the intermediate portion in the axial direction is expanded compared to the passage widths at the input portion and the output portion in the axial direction, whereby the passage opening area at the intermediate portion is expanded more than that of the input portion and the output portion. In this case, the end side passage serves as a return back portion in the axial direction in the coolant flow, and since the passage width of the intermediate portion of the end side passage in the axial direction is expended, the coolant readily flows into the expanded portion. Thus, the flow rate of the coolant can be reliably decreased at the end side passage so that an effect of suppressing the stagnation of the coolant in the vicinity of the wall surface of the coolant passage can be enhanced.

As a third aspect of the present disclosure, in the second aspect, the intermediate portion of the end side passage is configured at both sides in the axial direction such that a passage width thereof in the axial direction is expanded with respect to the input portion and the output portion.

In this case, since the passage width at the intermediate portion in the end side passage is expanded in both sides in the axial direction, the effect of reducing the flow rate of the coolant at the end side passage can be enhanced.

As a fourth aspect of the present disclosure, in the second or third aspect, at least one of passage walls of the end side passage at both ends in the axial direction is formed to have an arc shape in which a convex part is oriented outwards the passage, whereby a passage width of the intermediate portion in the axial direction is expanded.

In this case, the coolant is prompted to pass through the intermediate portion of the end side passage towards the downstream side, while stagnation (disturbance) occurs on the coolant flow. Thus, the coolant (hot water) where the temperature has increased can be prevented from being stagnated as much as possible.

As a fifth aspect of the present disclosure, in any one of the second to fourth aspects, a protrusion protruding inwardly in the axial direction is formed, in the cylindrical portion, on a passage wall located at an outward portion of the end side passage in the axial direction, and the protrusion narrows the passage width of the input portion and the output portion in the axial direction.

In the case where the coolant returns back in the axial direction at the first end side in the coolant passage, the coolant flows along the outer periphery side of the passage, that is, the passage wall located at an outward portion of the end side passage in the axial direction. Here, the protrusion is formed in the passage wall located at an outward portion of the end side passage in the axial direction, whereby the effect of reducing the flow rate of the coolant at the end side passage can be enhanced, compared to a configuration in which the protrusion is not formed on the passage wall.

As a sixth aspect of the present disclosure, in any one of first to fifth aspects, the end side passage is configured such that the passage width of in the radial direction is expanded at the intermediate portion compared to the passage widths of the input portion and the output portion.

In this case, the coolant flows into the expanded portion expanded in the radial direction, whereby the flow rate of the coolant in the end side passage can be lowered.

As a seventh aspect of the present disclosure, in any one of the first to sixth aspects, passage widths of the axial direction passages where the coolant flows in the axial direction in the coolant passage are changed such that the closer to the first end side from the second end side, the narrower the passage widths are.

A region in the first end side in the axial direction passages is a region where the flow direction of the coolant changes to the circumferential direction from the axial direction or the flow direction of the coolant changes to the axial direction from the circumferential direction. According to the above-described configuration, the coolant flow becomes smooth in the region where the flow direction of the coolant is changed between the axial direction and the circumferential direction, whereby flow separation from the passage wall can be suppressed. Thus, the cooling performance at the first end side can be enhanced.

As an eighth aspect, in any one of the first to seventh aspects, the axial direction passages where the coolant flows in the axial direction in the coolant passage is configured such that an outer periphery side passage walls in a returned portion in the first end side is formed in an arc shape or a chamfered shape.

A region in the first end side in the axial direction passages is a region where the flow direction of the coolant changes to the circumferential direction from the axial direction or the flow direction of the coolant changes to the axial direction from the circumferential direction. According to the above-described configuration, the coolant flow becomes smooth in the region where the flow direction of the coolant is changed between the axial direction and the circumferential direction, whereby the flow separation from the passage wall can be suppressed. Thus, the cooling performance at the first end side can be enhanced.

What is claimed is:

1. A rotary electric machine comprising:
    a rotor rotatably provided together with a rotary shaft;
    a first end side and a second end side, the first end side being one end side of the rotary electric machine in an axial direction of the rotor, the second end side being the other side of the rotary electric machine in the axial direction of the rotor;
    a stator disposed facing the rotor in a radial direction thereof;
    a cover disposed at the second end side;
    a housing having a cylindrical portion in which the stator is disposed radially inside or outside the rotor, the cylindrical portion including:
        an inner wall portion and an outer wall portion mutually facing inwardly/outwardly in the radial direction;
        an end plate portion disposed at the first end side; and
        a coolant passage having an annular shape provided between the inner wall portion and the outer wall portion to allow a coolant to flow through the coolant passage, the coolant passage meandering in the axial direction, a passage width of the coolant passage in the first end side in the radial direction being narrower than a passage width of the coolant passage in the second end side in the radial direction;
    an end side passage provided in the first end side, the coolant flowing through the end side passage in a circumferential direction, the end side passage having:
        an input portion in an upstream side of the coolant passage;
        an output portion in a downstream side of the coolant passage; and
        an intermediate portion between the input portion and the output portion, a passage opening area of the intermediate portion being larger than those of the input portion and the output portion; and
    a rotation sensor disposed in the first end side and configured to detect a rotational state of the rotor.

2. The rotary electric machine according to claim 1, wherein the end side passage is configured such that a passage width of the input portion and a passage width of the output portion is narrowed and a passage width in the axial direction at the intermediate portion is expanded.

3. The rotary electric machine according to claim 2, wherein the intermediate portion of the end side passage is configured at both sides in the axial direction such that a passage width thereof in the axial direction is expanded with respect to the input portion and the output portion.

4. The rotary electric machine according to claim 2, wherein at least one of passage walls of the end side passage at both ends in the axial direction is formed to have an arc shape in which a convex part is oriented outwards the passage, whereby a passage width of the intermediate portion in the axial direction is expanded.

5. The rotary electric machine according to claim 2, wherein a protrusion protruding inwardly in the axial direction is formed, in the cylindrical portion, on a passage wall located at an outward portion of the circumferential direction passage in the axial direction, and the protrusion narrows the passage width of the input portion and the output portion in the axial direction.

6. The rotary electric machine according to claim 1, wherein the end side passage is configured such that the passage width in the radial direction is expanded at the intermediate portion compared to the passage widths of the input portion and the output portion.

7. The rotary electric machine according to claim 1, wherein passage widths of the axial direction passages where the coolant flows in the axial direction in the coolant passage, are changed such that the closer to the first end side from the second end side, the narrower the passage widths are.

8. The rotary electric machine according to claim 1, wherein the axial direction passages where the coolant flows in the axial direction in the coolant passage is configured such that outer periphery side passage walls in a returned portion in the first end side is formed in an arc shape or a chamfered shape.

* * * * *